Patented Apr. 1, 1941

2,236,892

UNITED STATES PATENT OFFICE 2,236,892

MILK FILTER PAD

Frank C. Broeman, Cincinnati, Ohio, assignor to The Stearns & Foster Company, Lockland, Ohio, a corporation of Ohio No Drawing. Application January 10, 1938, Serial No. 184,248

6 Claims. (Cl. 210—204)

This invention relates to cotton wadding filter pads adapted to be used for filtering milk. The invention also relates to a preferred method for constituting these pads.

Milk filter pads are used by the farmers and dairymen for the purpose of removing twigs, particles of dirt, and other contamination, which gain entrance into raw milk during the milking process. The filtering, which is done before the milk is delivered to the collecting station or the bottling plant and, preferably, as soon after milking as possible, is conducted by pouring the raw milk into a delivery container through one of the filter pads held in the neck or funnel of a colander placed in the mouth of the delivery container.

The filter pads usually are of disc formation about six inches or more in diameter, and may vary anywhere from one-sixteenth to one-half an inch or more in thickness, when they are in the fresh, fluffy condition. It is the intention that they be cheap enough that a fresh pad may be used each time a can of milk is filtered. It is requisite also that the filtering material be strong enough that it may withstand the forces tending to tear it apart during the in-rush of the milk upon the dry pad. The first gush of milk being poured strikes the pad at a relatively localized area, and this section of the pad tends to part from the remaining portions which have not yet been wetted. However, if the pad becomes wetted without tearing, then it usually becomes compacted, under influence of the liquid and the weight of the head of milk above it, into a dense layer sufficiently permeable to permit the milk to pass through, but sufficiently impermeable to retain all of the particles of impurities and contamination. In order to provide the properties of rigidity and stability appropriate for withstanding the tendency of the milk to tear the pad and pass through it without being filtered, the cotton batting which as been used in the past has been glazed. For this purpose, starch has been the accepted material. In addition to the application of starch glazing, some of the pad manufacturers have provided cheesecloth facings, at one or both sides of the pad, for additional reenforcement.

The rapidity with which the milk passes through the filter is of importance to the farmhand or dairyman, who must hold the can containing the raw milk and continue to hold it and pour until all of the liquid in the can is filtered. The milk cans usually contain approximately 10 gallons, and weigh approximately 100 pounds, inclusive of the can. Since it frequently is necessary to handle fifty, a hundred, or more of these cans, the task becomes burdensome and tedious.

The objective of the present invention, briefly, has been to provide a cotton wadding filter pad which will filter milk at a faster rate than any of the pads which heretofore have been available. Another objective of the invention has been to provide a pad which is strengthened by a glazing which more specifically suits the pad for the purpose of filtering milk.

I have discovered that the nature of the media, which is used for sizing cotton batting, and particularly the solubility of the sizing media in milk, is related directly to the rapidity, or rate, at which the pad will filter milk under equal handling, volume, and head conditions. I have determined, for instance, that the speed of filtration possessed by a given filter pad can be increased anywhere from 18 to 25% by utilizing adhesive media such as glucose, which are freely soluble in milk, as the glazing medium, instead of the starch sizing which has been used, in the past, in glazing the cotton batting for milk filter pads. To illustrate in further detail, it has been determined that a pad of the invention, identical in construction with a conventional pad, except for the glazing, will pass and filter the contents of a can of milk in two and one-quarter minutes, whereas the conventional pads require from two and three-quarters to three minutes to filter the same volume of milk, under the same conditions. Such a saving in time required for the filtering of each can of milk, obviously constitutes an important reduction in the tedious labor and inconvenience of the usual filtering operation.

In the practice of the invention, the sizing or adhesive medium to be used is one which is truly water and milk soluble, as distinguished from the starch or conventional adhesives which are only partially and colloidally soluble therein. Being of poor solubility, the starch size at the surface of an old type of pad impeded the flow of milk, into the body of loosely carded fibres. Then, being only colloidally soluble, the starch, in separating from the surface sizing, actually became filtered from the milk in which it was carried, only to clog the passage of milk through the pad which, by this time, had become more densely compacted. By virtue of the fact that the size constitutes, at most, a temporary reenforcement, the rate of rapidity with which the size becomes dissolved in the milk is related directly to the rate at which a given volume of milk is permitted to pass through the pad. Therefore, it may be said that the concept of the invention is to provide a filter pad, comprised of cotton wadding which embodies a glazing at one or both sides of an adhesive size, truly soluble in milk, and possessing the capacity to form and integrate the surface fibers of the batting into a skin or porous lattice which is sufficiently strong and stable to withstand the tearing effects of the first in-rush of milk upon the pad.

While only a small quantity of the size is actually dissolved in the milk, still, for dietary and aesthetic reasons, the size itself should be edible and not distasteful, and, for this reason, I prefer to use the simple sugar glucose, as the sizing medium, although the more complex sugars which exhibit adhesive properties, and similar truly water soluble adhesives may be used. Soluble, edible adhesive sizes which are hygroscopic should not be used, since they tend to cause the pads to become sticky to the feel upon exposure to air.

Structurally, the filtering material of this invention comprises a sheet of carded cotton fibers, the outer surface fibers, at one or both sides of the sheet, being adhesively united sufficiently to give the sheet a structural stability. The sizing or adhesive used to unite the outer surface fibers constitutes glucose, or similar edible adhesive which is truly milk soluble.

A preferred method of constituting the filter membrane of the invention is as follows. Cotton fibers, dewaxed and preferably bleached, are carded into a sheet of requisite thickness. One such sheet, suitable for making filtering pads, is of such a thickness that the sheet weighs 1 to 8 ounces per square yard. The sheet, however, may be made thicker or thinner, depending upon the type of filtering colander, the nature and contamination of the milk being filtered, and in general, the volume of milk intended to be passed therethrough before the pad be discarded. In general, the method of constituting the sheet from the carded fibers is similar to that described as the old or customary method in Loomis Patent No. 1,928,567. The sheet, after carding to the requisite weight, is compressed to the desired thickness and is treated with the surface sizing to adhesively unite the surface webs into a lace-like or lattice structure. A typical example of a solution adapted to provide filter batting of the present invention comprises approximately a 4% aqueous solution of a commercial 47% solution of corn syrup. The concentration may be decreased to as low as 2% and up to about 10%, though beyond this point the pads tend to remain somewhat sticky.

This solution may be applied to the sheet by spraying, or brushing, or passing the sheet through rolls in such a manner and in such quantity that the size or adhesive, when applied to the sheet, unites the fibers structurally into a discontinuous coating or porous skin, but does not objectionably impair permeability of the membrane. This membrane, when so constituted, is characterized by a core of loosely knit and united cotton fibers, and a surface lattice, on one or both sides of the core, of relatively great structural stability as compared to the core, but having a porosity enabling the sheet to be used as a filter. If desirous, the membrane may be constituted according to the foregoing description and split into halves each of the halves being adapted for use as separate filtering membranes. Likewise, if desirous, the wadding or the split membranes may be reenforced, at one or both sides, by the application of cotton gauze, or cheesecloth. The fibers at the surface of the membrane are felted so as to constitute a membrane sufficiently strong to enable the pad to maintain its integrality even during the initial in-rush of milk upon the pad. Thereafter, as a head or column of milk is built up over the pad in the receiving colander, the sugar adhesive is dissolved from the surface skin and the porosity of the membrane is increased without impairment of its dirt collecting capacity.

Having described my invention, I claim:

1. A filtering membrane adapted for filtering milk, comprising, a thin layer of carded cotton fibers covered discontinuously on a side with an edible organic sugar which is freely soluble in milk at room temperature, the said sugar acting as an adhesive and adapted to impart to the membrane the structural stability requisite for withstanding the passage of milk therethrough without decreasing the permeability of the membrane.

2. A filtering pad for filtering milk, which comprises a sheet of carded cotton fibers surfaced with a skin of cotton fibers adhesively united into a lattice structure of relatively high permeability, with an edible organic sugar sizing medium which is freely soluble in milk at room temperature.

3. A filtering membrane for use in filtering milk, comprising, a sheet of carded cotton fibers covered on a side by a porous skin of cotton fibers flexibly united to form a lattice structure possessed of structural stability as compared to the carded cotton sheet, with an adhesive consisting essentially of glucose.

4. A filtering membrane for use in filtering milk, comprising, a sheet of carded cotton fibers surfaced with a skin of cotton fibers united into a lattice structure of relatively high permeability by sizing media consisting essentially of glucose and reenforced with a cotton gauze sheeting.

5. A filter pad for use in filtering milk, comprising, a sheet of carded cotton fibers of disc configuration surfaced with a skin of cotton fibers united into a lattice structure of relatively high permeability, with an adhesive consisting essentially of glucose.

6. A filtering membrane for use in filtering milk, comprising, a combination of a sheet of carded cotton fibers of disc configuration surfaced with a skin of cotton fibers united into a porous skin, with an adhesive consisting essentially of an edible organic sugar which is freely soluble in milk, and a sheet of cotton gauze reenforcing the membrane.

FRANK C. BROEMAN.